Feb. 5, 1935. M. D. FITZGERALD 1,990,430
GAUGING TOOL FOR SPARK PLUGS
Filed Nov. 16, 1933
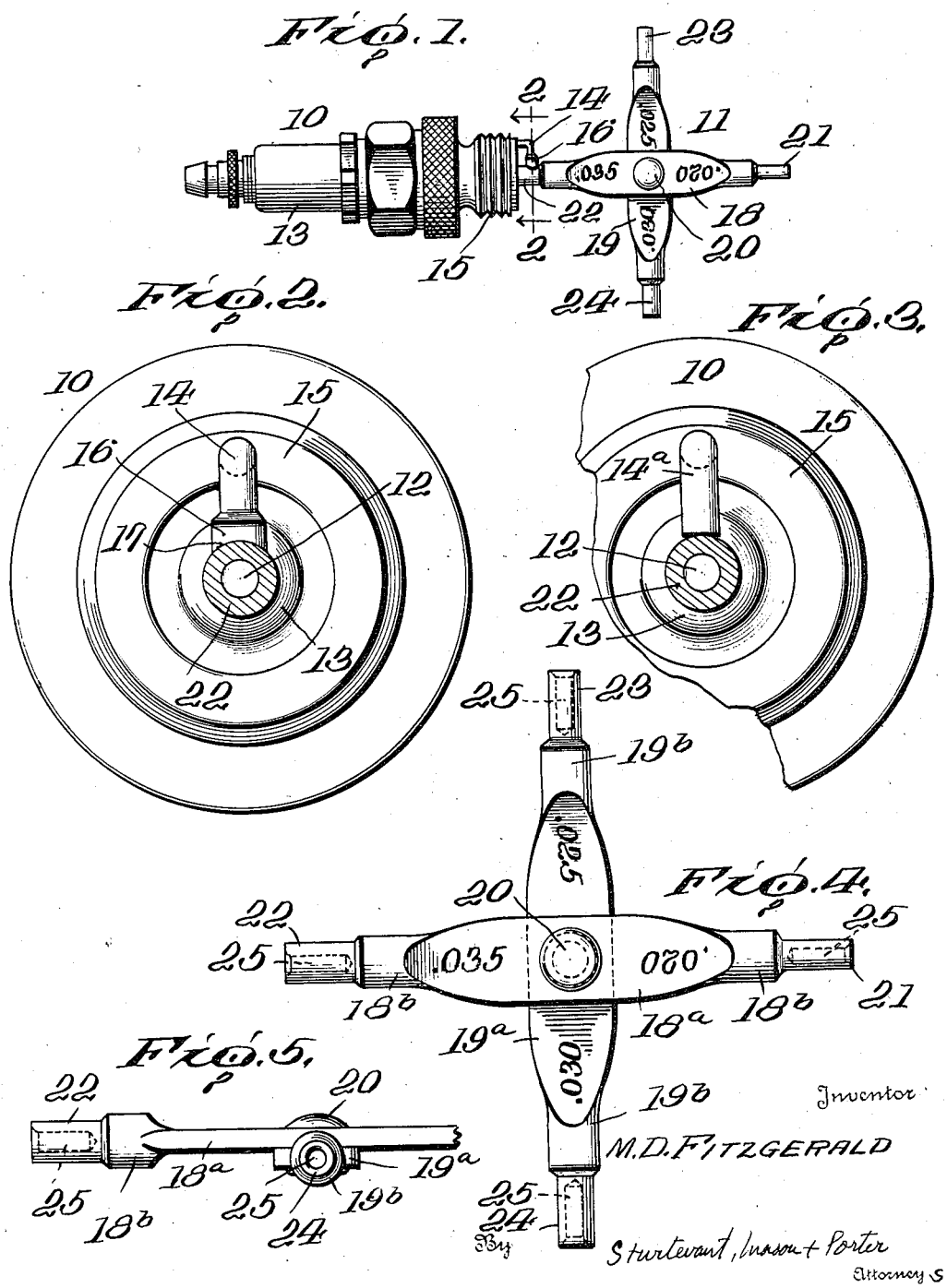
Inventor
M. D. FITZGERALD
Sturtevant, Mason & Porter
Attorneys Patented Feb. 5, 1935

1,990,430

UNITED STATES PATENT OFFICE 1,990,430

GAUGING TOOL FOR SPARK PLUGS

Martin D. Fitzgerald, Torrington, Conn., assignor to The Fitzgerald Manufacturing Company, Torrington, Conn., a corporation of Connecticut Application November 16, 1933, Serial No. 698,370

2 Claims. (Cl. 33—168)

The present invention relates to improvements in gauging tools for spark plugs and more particularly to a combined gauge and tool for adjusting the spark gap between the electrodes of a spark plug.

An object of the present invention is to provide an improved gauging tool for spark plugs wherein a recess is provided in an end of the tool whereby to permit the end of one of the electrodes to fit therein, and wherein the peripheral wall of said recess is of uniform thickness and this thickness of the wall is the same as the desired gap distance between the electrodes whereby to provide a gauge for indicating accurately the proper gap distance.

A further object of the invention is to provide an improved gauging tool for spark plugs wherein there are provided a plurality of recesses of the same diameter, but wherein each recess is bounded by a peripheral wall of a different thickness whereby to provide a plurality of gauging distances in order to properly adjust the spark gaps between the electrodes of a spark plug to different distances, depending upon the particular conditions of use.

A still further object of the present invention is to provide an improved gauging tool of the type referred to wherein after the electrode is fitted within a recess, the tool may be manipulated to slightly bend the electrode until it is disposed at the proper distance from the cooperating electrode.

The invention still further aims to provide an improved gauging tool of the type referred to, which is inexpensively manufactured and which will readily afford an accurate way of adjusting the electrodes of a spark plug whereby to provide the desired spark gap distance.

These and other objects of the invention will in part be obvious and will be hereinafter more fully pointed out.

In the drawing:

Figure 1 is a view showing the manner in which the gauging tool is applied to the center electrode of a spark plug;

Fig. 2 is a sectional view taken along the line 2—2 of Fig. 1, showing the position of the guaging wall of the tool with respect to a shell electrode having an arcuate sparking surface;

Fig. 3 is a similar view showing a straight shell electrode with the gauging tool in position over the center electrode;

Fig. 4 is a plan view of the gauging tool, and

Fig. 5 is a fragmentary side elevation of the gauging tool.

The gauging tool which is the subject of the present invention, consists generally of a plurality of crossed metal members having cylindrical ends. These members may be suitably secured together in a manner which permits their being collapsed in order to occupy a minimum amount of space when the tool is not being used. The cylindrical ends of the members are each provided with a recess of substantially uniform diameter. The cylindrical ends, in themselves, however, are of different diameters whereby the thickness of the peripheral wall of each recess varies. The thickness of each wall is adapted to conform to the desired distance between the electrodes of a spark plug. Suitable indicia may be inscribed on the body portion of the crossed members to indicate the thickness of each wall. The center electrode of a spark plug is inserted within one of the recesses, the thickness of the wall of which corresponds to the desired spark gap distance. If, when thus applied, the cylindrical wall does not exactly fit between the two electrodes, then the tool may be manipulated in a manner which will bend the center electrode to the proper position so that the wall exactly fits between the electrodes. If the gap distance is too small, the forcing of the tool on the center electrode will tend to spread the electrodes to proper position.

Referring more in detail to the accompanying drawing, a spark plug 10 is illustrated in Fig. 1 with the gauging tool 11 applied thereto. The spark plug 10 is provided with a central electrode 12 which extends through the porcelain core 13 and an outer electrode 14 which is mounted in the threaded shell 15. As shown in Fig. 2, the outer electrode 14 is provided with an enlarged end portion 16 which is provided with an arcuate recess 17. The surface of the recess 17 is substantially parallel to and concentric with the adjacent surface of the center electrode 12. This particular type of spark plug is described in detail in the co-pending application of Patrick J. Fitzgerald, Serial Number 664,987, filed April 7, 1933. In Fig. 3, another type of spark plug is illustrated. This spark plug is provided with a shell electrode 14a, the end of which is perfectly straight.

The gauging tool 11 consists of two metal members 18, 19, which are provided with flattened central portions 18a, 19a, which, in turn, merge into cylindrical portions 18b, 19b at the ends of the cross members 18, 19, respectively. A rivet 20 is passed centrally through the flattened portions 18a, 19a, whereby to hold the cross members 18, 19 together and permit the same to be turned with respect to one another and thus fold the device when not in use. It is to be clearly understood, however, that the cross members 18, 19 may be made integral with each other and that any number of such members may be employed. The member 18 is provided with cylindrical ends or sleeves 21, 22 which extend beyond the cylindrical portions 18b thereof. The member 19 is likewise provided with cylindrical ends or sleeves 23, 24 which extend beyond the cylindrical portions 19b thereof. Each of these cylindrical ends 21, 22, 23 and 24 is provided with an identical co-axial recess 25. The diameters of the cylindrical ends vary, however, so that the thickness of the peripheral wall surrounding each recess varies accordingly, inasmuch as the recesses 25 are of uniform diameter. The outer edge of the peripheral wall of each cylindrical end is chamfered to permit the easy positioning of the end over the electrode of the spark plug.

As indicated in the drawing, suitable numbers designating the various spark gap distances, which correspond to each end, are inscribed on the flat portions 18a, 19a of the members 18, 19. The annular thickness of the peripheral wall of the end 24 is greater than that of the peripheral wall of the end 22. The annular thickness of the peripheral wall 22 is likewise greater than that of the peripheral wall 23, which, in turn, is greater than the annular thickness of the peripheral wall of the smallest end 21. In this manner, there are available four separate gauging distances, and any one, depending upon the conditions of use, may be employed in adjusting the distance between the electrodes of a spark plug.

As shown in the accompanying drawing, the gauging tool 11 is applied to a spark plug 10 with the central electrode 12 thereof inserted within the opening 25 in one of the cylindrical ends of the tool. The particular sleeve end which is to be employed will depend, of course, on the required spark gap distance and the end whose wall thickness corresponds to this distance will be selected. This gauging tool is peculiarly adapted to be used with the type of spark plug shown in Fig. 2, because a flat gauging surface would not properly indicate the gap distance inasmuch as the surface of the shell electrode 14 is arcuate and parallel to and concentric with the adjacent surface of the center electrode 12. With the present tool 11, however, an arcuate gauging surface is provided by the cylindrical walls of the ends of the tool and, in this manner, the exact gap distance between all adjacent points of the electrodes may be obtained. If the surface of the shell electrode 14 does not touch the outer surface of the tool end which is used, the tool may be manipulated to bend the center electrode 12 until the distance is correct according to the thickness of the peripheral wall of the tool end. If the electrodes are too close together, the tool end may be urged over the center electrode and thus manipulated to bend the center electrode away from the shell electrode until the proper distance between them is obtained. As shown in Fig. 3, this gauging tool is equally well adapted for use with spark plugs of other types, as, for instance, where the shell electrode 14a is straight.

By the provision of a cylindrical gauging wall, the accuracy of the gauge is maintained because the same surface will seldom be used repeatedly, and furthermore, the gauge is well adapted for use as a tool for bending the electrode to proper position, although other tools may be employed also. If the shell electrode should extend directly below the end of the center electrode, the tool is equally well adapted for use therewith by simply inserting the straight end of the shell electrode within one of the openings 25, and thus getting the proper gap distance between the electrodes. Obviously, too, any number of cylindrical ends may be used for gauging.

It is to be understood that minor changes in the details of construction and arrangement of parts may be made without departing from the scope of the invention as set forth in the appended claims.

Having thus described the invention, what I claim as new and desire to secure by Letters Patent, is—

1. A gauging tool for adjusting the spark gap between the electrodes of a spark plug, comprising a handle portion, and a recessed cylindrical end portion having the annular thickness of the wall thereof equal to the desired spark gap distance, the recessed portion of the cylindrical end snugly fitting the electrode and being long enough to receive a portion of the same whereby said electrode may be bent by manipulation of the handle portion.

2. A gauging tool for adjusting the spark gap between the electrodes of a spark plug wherein the end of the outer electrode is provided with an arcuate surface which is parallel to and concentric with the adjacent surface of the center electrode, said gauging tool comprising a member provided with a handle portion and a cylindrical end portion having a recess adapted to receive the end of the center electrode, the annular thickness of the wall of said end portion being equal to the desired spark gap distance and the outer surface of said end portion being concentric with the arcuate end of said outer electrode whereby to accurately gauge the spark gap distance at all points, the handle portion of said member serving as a means for moving the same whereby to adjust the center electrode to proper position.

MARTIN D. FITZGERALD.